United States Patent [19]
Lach et al.

[11] Patent Number: 5,313,054
[45] Date of Patent: May 17, 1994

[54] METHOD AND DEVICE FOR DETERMINING THE ORIENTATION OF A SOLID

[75] Inventors: Patrick Lach, Bordeaux; Jean-Blaise Migozzi, Orsay, both of France

[73] Assignee: Sextant Avionique, Meudon La Foret, France

[21] Appl. No.: 963,403

[22] Filed: Oct. 16, 1992

[30] Foreign Application Priority Data

Oct. 25, 1991 [FR] France .................. 91 13219

[51] Int. Cl.$^5$ ............................................. H01J 40/14
[52] U.S. Cl. ............................ 250/206.2; 250/561; 356/152
[58] Field of Search ............... 250/206.1, 206.2, 206.3, 250/203.3, 203.6, 561; 356/141, 152, 400, 401

[56] References Cited

U.S. PATENT DOCUMENTS

| | | | |
|---|---|---|---|
| 4,193,689 | 3/1980 | Reymond et al. ................ | 356/152 |
| 4,396,945 | 8/1983 | DiMatteo et al. . | |
| 4,613,942 | 9/1986 | Chen ................................... | 250/561 |
| 4,639,878 | 1/1987 | Day et al. . | |
| 4,896,962 | 1/1990 | Menn et al. ...................... | 250/203.3 |
| 4,923,303 | 5/1990 | Lutz ................................... | 250/203.6 |
| 5,059,789 | 10/1991 | Salcudean . | |

FOREIGN PATENT DOCUMENTS 2551860 3/1985 France .
2157426 10/1985 United Kingdom .

*Primary Examiner*—David C. Nelms
*Attorney, Agent, or Firm*—Meltzer, Lippe, Goldstein, et al.

[57] ABSTRACT

In an optical device for determining parameters that give the orientation of any solid within a given space, a first solid is fitted with at least one single-beam device producing a beam of light rays substantially parallel to a direction $\vec{u_i}$ known in a coordinate system $R_s$ bound to the first solid, said beam of light rays containing an item of information that enables direction $\vec{u_i}$ to be determined, and a second solid is fitted with at least one elementary sensor capable of picking up light rays originating substantially from a direction parallel to $\vec{V_j}$ known in a coordinate system $R_o$; each sensor includes means for reading the information in the beam it has picked up when directions $\vec{u_i}$ and $\vec{V_j}$ correspond and the information thus read is processed to extract the parameters giving the orientation of coordinate system $R_s$ relative to coordinate system $R_o$. One valuable application of the invention relates to the orientation of the headset of an aircraft or helicopter pilot relative to the pilot's cabin.

9 Claims, 2 Drawing Sheets

METHOD AND DEVICE FOR DETERMINING THE ORIENTATION OF A SOLID

BACKGROUND OF THE INVENTION

1. Field of the invention

The present invention relates to a method and a device for determining the orientation of any solid body within a given space.

Numerous systems need to know, in practically real time, how the parameters of orientation of a solid within a given reference frame are changing, and to be able to track this change. This is notably the case of visor systems mounted on the actual headsets of aircraft and helicopter pilots, enabling them to see the image of a grating which is projected at infinity and superimposed on outside scenes. It is absolutely essential that the images received by the pilot always correspond to the coordinate system of the carrier (aircraft, helicopter etc.) regardless of movements of the headset with respect thereto, so as to be able to indicate, for example, a lined-up target to a weaponry system.

2. Prior art

The use of an electromagnetic position and orientation detector is known which comprises, firstly, a transmitter having a fixed position in the given coordinate system comprising three windings that are each energised in turn by a generator and, secondly, a sensor fixed to the solid and also consisting of three windings whereby for each position of the solid, there are nine corresponding signals induced by the windings of the transmitter, these nine signals enabling the position and orientation of the solid to be calculated. However, the electromagnetic fields set up or induced can suffer considerable interference as the result of the presence of metallic elements in the surroundings, and such a detector requires either the use of auxiliary means to supply a reference signal for correction purposes (French patent 2,655,415), or the use of a preliminary phase in which modelling is performed to take account of such interference.

Electro-optical systems also exist which involve placing a certain number of marks on the solid which can be emitting or non-emitting point or surface marks, their position in a coordinate system $R_s$ bound to the solid being well known, after which, using optical detectors fixed in the coordinate system $R_o$ of the measurement space, the position of a certain number of straight lines or curves which link at least two separate marks of the solid are located. It can be shown that the errors in measurement of the solid's orientation parameters is on the one hand proportional to the uncertainty regarding measurement of the position of the marks in the coordinate system $R_o$, and, on the other hand, inversely proportional to the distance that separates these marks. Such systems are hence better suited to solids of appreciable size for which there can be a large spacing between the marks, but the measurements still make it necessary to calculate the position of at least two points on the solid.

SUMMARY OF THE INVENTION

The present invention sets out to overcome the disadvantages or limitations recited above through the provision of an optical method for determining the orientation of any solid body whatsoever with respect to a reference frame $R_o$, independently of the positions of this solid within $R_o$.

More precisely, the invention provides an optical method for determining parameters giving the orientation of a coordinate system $R_s$ bound to a first solid with respect to a second coordinate system $R_o$ bound to a second solid constituting a reference, independently of the position of the said coordinate system $R_s$ within coordinate system $R_o$ comprising the steps of:

projecting at least one beam of light rays from the first solid substantially parallel to a direction $u_i$ known in coordinate system $R_s$, the beam of light rays containing an item of information that identifies said direction with respect to coordinate system $R_s$;

receiving at least partially a beam of light rays on at least one elementary sensor of the second solid, said sensor being capable of picking up light beams originating substantially from one single direction v known in coordinate system $R_o$;

reading the information contained in the beam received by said elementary sensor;

extracting the parameters of orientation of coordinate system $R_s$ relative to coordinate system $R_o$, using calculation based on a knowledge of the elementary sensor that received said beam of light rays and the result of reading said information.

The invention further provides a device enabling the method to be carried out.

BRIEF DESCRIPTION OF THE DRAWINGS

The invention and its advantages will be better understood from the description that follows taken in conjunction with the attached drawings in which.

DETAILED DESCRIPTION OF PREFERRED EMBODIMENT

Figure 1A:
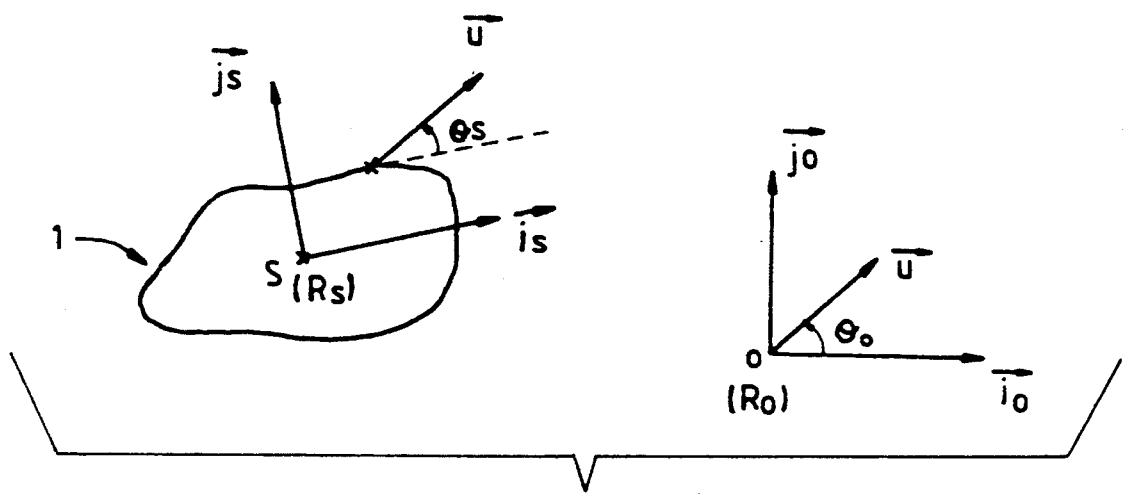
FIG. 1 (1a and 1b) illustrates the method for determining the orientation parameters according to the invention in a two-dimensional measurement space.

Let us first consider the most elementary assumption shown in FIG. 1a, where the measurement space is a two-dimensional space with a coordinate system $R_o$ and basic vectors ($\vec{i_o}, \vec{j_o}$). Imagine a solid symbolized by a plane 1 which is coplanar with the measurement space and with coordinate system $R_s$ and vectors ($\vec{i_s}, \vec{j_s}$). The orientation of solid 1 in this measurement space is perfectly determined as soon as a vector that is known in $R_s$ can be expressed in $R_o$.

Let us suppose that there is a vector $\vec{u}$ which is perfectly known in $R_s$, for example through the angle $\theta_s$ that it makes with $\vec{i_s}$. The problem posed would be fully resolved if it was possible firstly, to express u in the coordinate system $R_o$, for example by the angle $\theta_o$, and secondly, to transmit to coordinate system $R_o$ information enabling u to be identified in $R_s$, for example the angle $\theta_s$. A knowledge of $\theta_s$ and $\theta_o$ in the same measurement space would then make it possible to extract the angle $(\theta_s - \theta_o)$ between the vectors $\vec{i_s}$ and $\vec{i_o}$ thus characterizing the orientation of $R_s$ with respect to $R_o$.

Figure 1B:
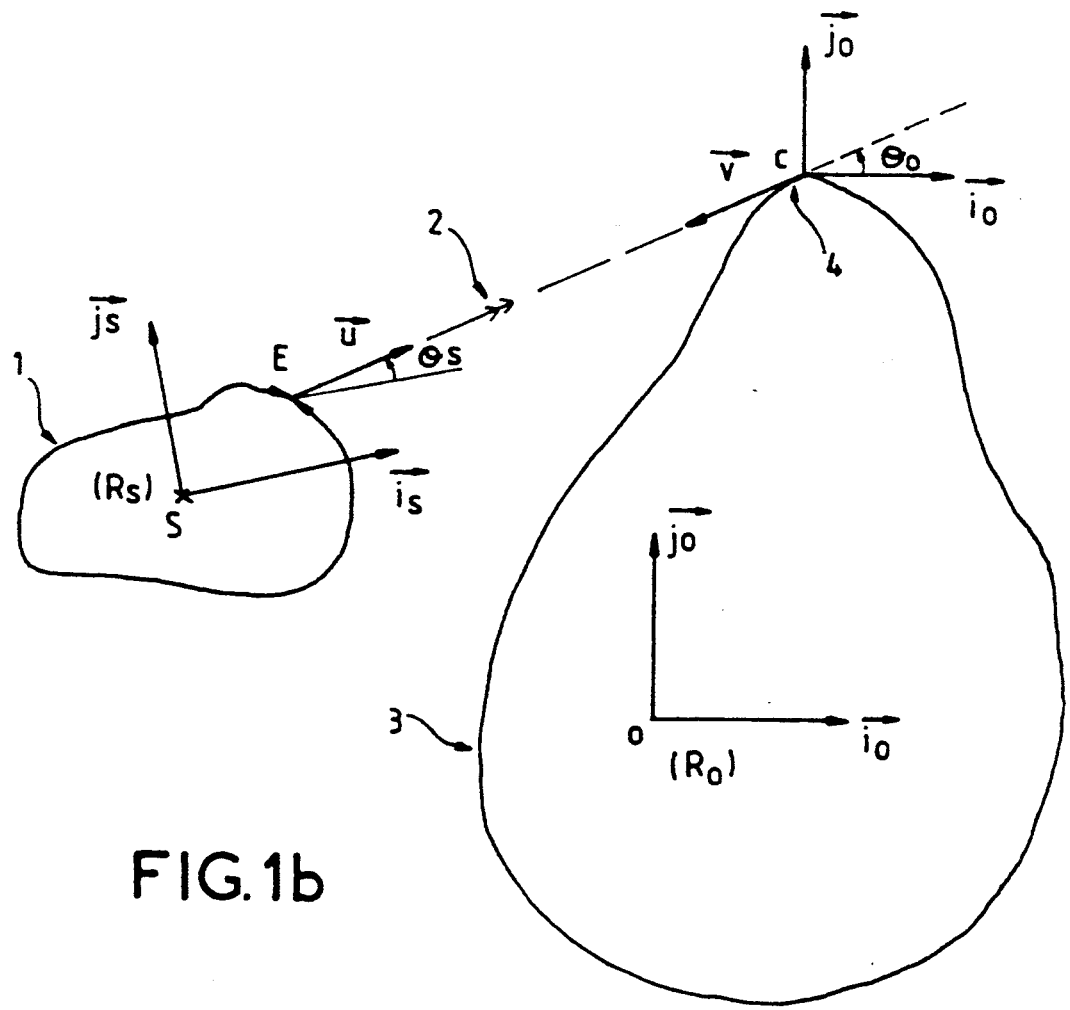

The method of measurement according to the invention is based on the above principle, as illustrated in FIG. 1b.

Starting from a first solid symbolized by plane 1 having coordinate system $R_s(S, i_s, j_s)$ a beam of light rays which are substantially parallel to each other are projected in the identifiable u, identifiable in $R_s$ by, for example, the angle $\theta_s$. According to one essential feature of the invention this beam contains information relating to the positioning of u in $R_s$, for example $\theta_s$. Moreover, in the two-dimensional measurement space which consists in practice of a second solid 3 coplanar with the first solid 1 and with coordinate system $R_o$ (O, $\vec{i}_s, \vec{j}_s$), an elementary optical sensor 4 located at a point C determined in $R_o$, will pick up the rays arriving in a direction v, which is perfectly known in $R_o$, for example the angle $\theta_o$. When there is coincidence between the directions u and v, it is possible to immediately obtain and without calculation, the expression for u in $R_o$. In accordance with a further fundamental characteristic of the invention, the sensor 4 is provided with reading means (not shown) that are capable of reading the information contained in the beams of rays picked up. The knowledge of u simultaneously in $R_o$ and in $R_s$ then makes it possible to extract, using calculation, the orientation parameters of $R_s$ with respect to $R_o$, which can be reduced, in this precise case, to an angle.

In order to be able to locate and track a solid, regardless of its orientation and position in a certain measurement field, it is preferable to project a plurality of beams of rays starting from the first solid 1, each ray of a beam being substantially parallel to a direction $u_i$, each beam including an item of information for identifying this direction $u_i$ with respect to the coordinate system $R_s$, and/or to fit the second solid 3 with several elementary sensors $C_j$ each of which are capable of picking up a beam originating from a single direction $V_j$.

Calculation for extracting the parameters for the orientation of coordinate system $R_s$ with respect to $R_o$ depends on the number of directions that are picked up, this number being less than or equal to the number of elementary sensors $C_j$: in the case of FIG. 1b, we have seen that picking up one single direction enables the angle between the vectors $i_s$ and $i_o$ to be extracted, this parameter alone being sufficient to characterize the orientation of two coplanar coordinate systems.

Figure 2:
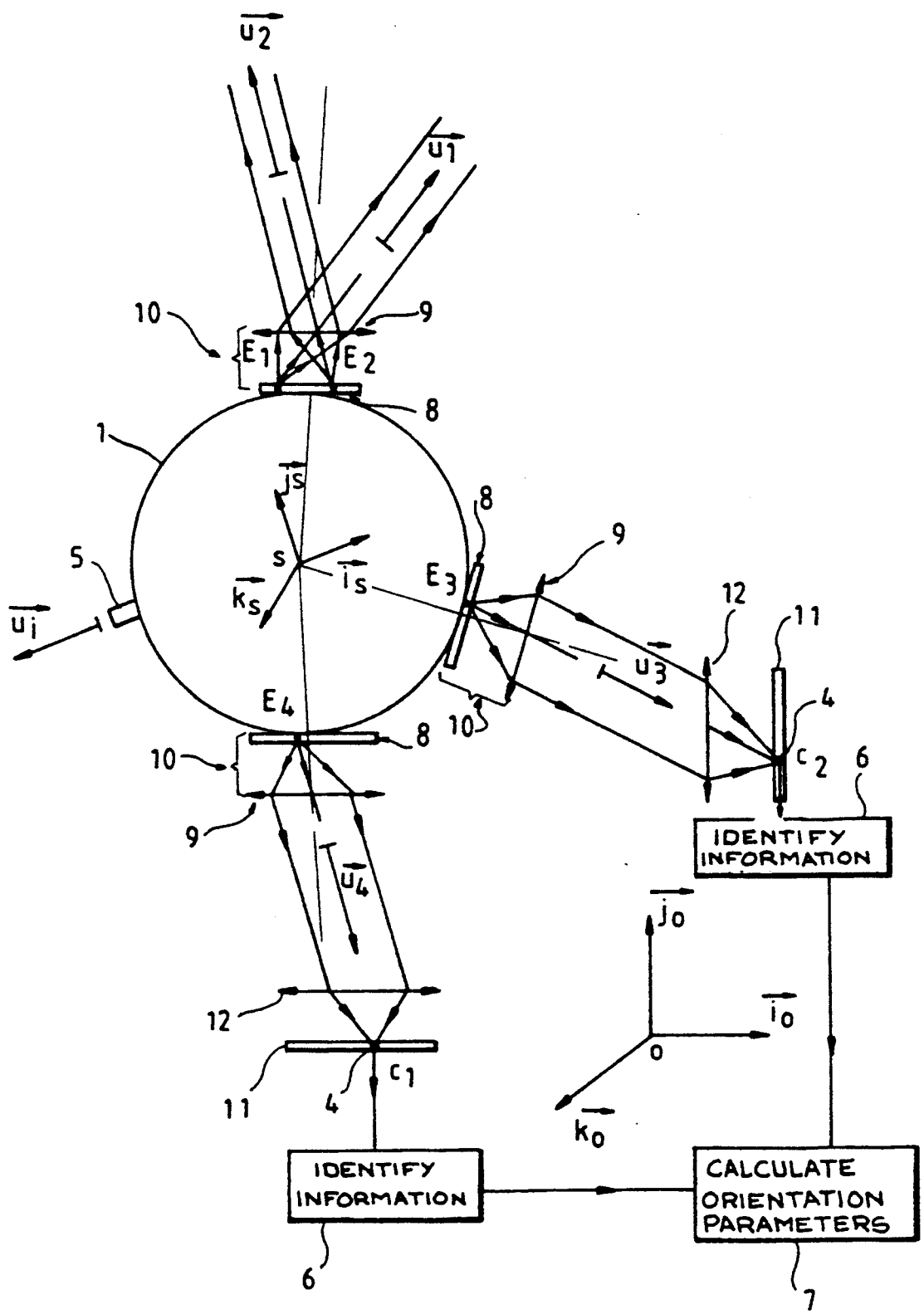
FIG. 2 illustrates a device enabling the method according to the invention to be carried out, extended to the case of a three-dimensional measurement space.

FIG. 2 illustrates the extension of the invention to a three-dimensional measurement space with a reference coordinate system $R_o$ (O, $i_o, j_o, k_o$), this space consisting in practice, for example, of the pilot's cabin of an aircraft or a helicopter. Several elementary sensors 4 individually identified by reference $C_j$, and which are fixed with respect to $R_o$ are arranged within this measurement space. Each one of the sensors $C_j$ is capable of picking up all or part of the rays of a light beam, said rays being substantially parallel to a direction $V_j$ which is perfectly identifiable within the coordinate system $R_O$. Moreover, a solid 1 which is movable within the measurement space is bound to a coordinate system $R_s$ (S, $i_s, j_s, k_s$). This solid may, for example, be the pilot's headset visor. In accordance with the invention, the solid 1 carries one or several single-beam devices 5 on its periphery, each producing a beam of light rays that are substantially parallel to a direction $u_i$ which is perfectly identifiable within the coordinate system $R_s$. As shown in FIG. 2, an elementary sensor $C_j$ is able to pick up all or part of a beam of rays originating from a direction $u_i$, i being different from j. In accordance with one essential feature of the invention, each beam of light rays produced by a single-beam device 5 contains an item of information that identifies the direction $u_i$ with respect to coordinate system $R_s$. Each elementary sensor 4 further includes means 6 for reading the information contained in the partially or completely picked-up beam of rays. A certain number of items of information are then transmitted to a device 7 for extracting solid 1's orientation parameters, in other words those of coordinate system $R_s$, with respect to the measurement space, in other words coordinate system $R_o$. In practice, the single-beam devices 5 are optical systems which form an image to infinity by the projection of a beam of light rays substantially parallel to a given direction. Information regarding this direction is achieved physically through intensity modulation of the various rays of a given beam.

FIG. 2 illustrates a preferred embodiment in which elementary single-beam devices 5 are grouped together into a plurality of multi-beam devices 10 consisting for example of a sighting pattern 8 located in the focal plane of a collimating lens 9, so that the image of the sighting pattern is projected to infinity. Each point $E_i$ of a sighting pattern 8 corresponds to a fixed direction of coordinate system $R_s$ and produces, through the principle of collimation, a beam of light rays substantially parallel to a direction $u_i$. Moreover, each point $E_i$ includes a symbol carried in its vicinity enabling it to be identified. Sighting pattern 8 which can be either transmissive or reflective is consequently illuminated by any suitable light source (not shown). In a manner which is equivalent to the above grouping, the elementary sensors $C_j$ can be grouped together on sensors 11, for example of the CCD type, associated with a converging lens 12.

When a sensor 11 intercepts a beam of light rays substantially parallel to a direction $u_i$, an image of the point $E_i$ and its associated symbol gets formed on the sensor. For the point $C_j$ of sensor 11 at which point $E_i$ is focused, there is a corresponding direction $V_j$ which is well known in $R_o$, and which coincides with the direction $u_i$. It is thus possible to express $u_i$ in terms of $R_o$. Parameter extracting device 7 analyzes the content of the image formed by the sensor and identifies the symbol or item of information that appears in the vicinity of the point that has been picked up. This symbol enables point $E_i$ to be identified and $u_i$ to be expressed in coordinate system $R_s$. Using a certain number of measurements which each lead to a pair of expressions for the same vector in $R_o$ and $R_s$, it is now easy to calculate the orientation of $R_s$ with respect to $R_o$. In the simplest case, where three vectors $u_1, u_2, u_3$ which are linearly independent are detected, calculation consists in resolving a system of nine linear equations with nine unknowns.

In another possible embodiment, the whole combination of a sighting pattern 8 and its associated collimating lens 9 can be replaced by a hologram obtained by recording the sighting pattern's image thrown to infinity. By now re-illuminating the hologram which now exactly replaces the previous combination in a suitable way, the recorded image can be restored with the information in coded form. The advantage of using the hologram obviously resides in the space saving that results compared to the above combination (sighting pattern, collimating lens).

The invention as described has the particular value when compared to prior art systems, of being able to provide very high accuracy, resulting from its independence of operation vis-a-vis the successive positions of solid 1. Moreover, having direct access to the information contained in the transmitted beams enables calculation to be greatly simplified.

What is claimed is:

1. An optical method for determining parameters giving the orientation of a coordinate system $R_s$ bound to a first solid with respect to a second coordinate system $R_o$ bound to a second solid constituting a reference, independently of the position of coordinate system $R_s$ within coordinate system $R_o$ comprising the steps of:

projecting at least one beam of light rays from said first solid substantially parallel to a direction u known in coordinate system $R_s$, said beam of light rays containing an item of information that identifies said direction with respect to coordinate system $R_s$;

receiving at least partially a beam of light rays on at least one elementary sensor of said second solid, said sensor being capable of picking up light beams originating substantially from one single direction v known in coordinate system $R_o$;

reading the information contained in the beam received by said elementary sensor;

extracting the parameters of orientation of coordinate system $R_s$ relative to coordinate system $R_o$, using calculation based on a knowledge of the elementary sensor that received said beam of light rays and the result of reading said information.

2. An optical device for determining parameters giving the orientation of a coordinate system $R_s$ bound to a first solid with respect to a second coordinate system $R_o$ bound to a second solid constituting a reference, independently of the position of coordinate system $R_s$ in coordinate system $R_o$ comprising:

at least one single-beam device located at the periphery of said first solid and producing a beam of light rays substantially parallel to a direction $u_i$ known in coordinate system $R_s$, said beam of light rays containing an item of information that identifies said direction $u_i$ with respect to coordinate system $R_s$;

at least one elementary sensor fixed with respect to said coordinate system $R_o$ and capable of picking up all or part of a beam of light rays originating substantially from a direction $V_j$ known in coordinate system $R_o$;

means for reading the information contained in the beam of rays thus picked up;

means for extracting the parameters of orientation of coordinate system $R_s$ relative to coordinate system $R_o$.

3. An optical device according to claim 2, wherein said single-beam device is an optical system forming an image to infinity.

4. An optical device according to claim 2, wherein several single-beam devices are grouped together into a plurality of multi-beam devices consisting of a sighting pattern located in the focal plane of a collimating lens.

5. An optical device according to claim 4, wherein said sighting pattern consists of a plurality of points $E_i$ corresponding to a fixed direction of coordinate system $R_s$, said information being posted in the vicinity of each said point $E_i$ to allow identification thereof.

6. An optical device according to claim 4, wherein said sighting pattern is light transmitting.

7. An optical device according to claim 4, wherein said sighting pattern is light reflective.

8. An optical device according to claim 4, wherein said multi-beam devices consist of a hologram obtained by recording the image of said sighting pattern thrown to infinity.

9. An optical device according to claim 2, wherein a number of elementary sensors are grouped together into a plurality of sensor units, each sensor unit being associated with a converging lens.

* * * * *